(12) United States Patent
Jagar et al.

(10) Patent No.: US 8,784,552 B2
(45) Date of Patent: Jul. 22, 2014

(54) METHOD FOR PRODUCING A BRAKE LINING AND BRAKE LINING

(75) Inventors: Christina Jagar, Leverkusen (DE); Andrew Dilnot, Leverkusen (DE); Petra Severit, Limburg A.d. Lahn (DE)

(73) Assignee: TMD Friction Services GmbH, Leverkusen (DE)

( * ) Notice: Subject to any disclaimer, the term of this patent is extended or adjusted under 35 U.S.C. 154(b) by 353 days.

(21) Appl. No.: 13/201,639

(22) PCT Filed: Feb. 11, 2010

(86) PCT No.: PCT/EP2010/000822
§ 371 (c)(1),
(2), (4) Date: Aug. 16, 2011

(87) PCT Pub. No.: WO2010/094421
PCT Pub. Date: Aug. 26, 2010

(65) Prior Publication Data
US 2011/0297041 A1 Dec. 8, 2011

(30) Foreign Application Priority Data
Feb. 17, 2009 (DE) .......................... 10 2009 009 131

(51) Int. Cl.
*C09K 3/14* (2006.01)
*F16D 69/00* (2006.01)
*F16D 69/02* (2006.01)
*B32B 3/00* (2006.01)

(52) U.S. Cl.
USPC .................. 106/36; 188/251 A; 428/66.2

(58) Field of Classification Search
USPC .......... 106/36; 523/149; 188/251 A; 428/66.2
See application file for complete search history.

(56) References Cited

U.S. PATENT DOCUMENTS

| | | | | |
|---|---|---|---|---|
| 4,226,758 A * | 10/1980 | Sumira | | 523/153 |
| 4,256,801 A * | 3/1981 | Chuluda | | 442/322 |
| 4,743,634 A | 5/1988 | Royer | | |
| 5,433,774 A | 7/1995 | Kapl et al. | | |
| 5,989,390 A * | 11/1999 | Lee | | 162/141 |
| 6,060,536 A * | 5/2000 | Matsumoto et al. | | 523/156 |
| 6,110,991 A * | 8/2000 | Kaminski et al. | | 523/156 |
| 6,121,168 A * | 9/2000 | Irifune et al. | | 442/169 |
| 6,586,373 B2 * | 7/2003 | Suzuki et al. | | 508/101 |
| 6,656,240 B2 | 12/2003 | Chiba | | |
| 2004/0043193 A1 | 3/2004 | Chen et al. | | |

FOREIGN PATENT DOCUMENTS

| | | | |
|---|---|---|---|
| CN | 2126227 U | 12/1992 | |
| CN | 1446875 A | 10/2003 | |
| DE | 4420593 A1 * | 12/1994 | |
| EP | 1233203 A1 | 8/2002 | |
| EP | 1394438 A1 | 3/2004 | |
| JP | 61106687 A | 5/1986 | |
| JP | H01-216135 A | 8/1989 | |
| JP | H05-247445 A | 9/1993 | |
| JP | 06025651 A * | 2/1994 | |
| JP | 07076627 A * | 3/1995 | |
| JP | 2003-160780 A | 6/2003 | |
| JP | 2003-172386 A | 6/2003 | |
| JP | 2003-194121 A | 7/2003 | |
| JP | 2005-171042 A | 6/2005 | |
| JP | 2008-056893 A * | 3/2008 | C09K 3/14 |
| JP | 2008-539315 A | 11/2008 | |
| RU | 2115513 C1 | 7/1998 | |
| WO | 2006116474 A2 | 11/2006 | |

OTHER PUBLICATIONS

Machine Translation of German Patent Specification No. DE 4420593A (Dec. 1994).*
Machine Translation of Japanese Patent Specification No. JP 07-076627A (Mar. 1995).*
Search Report issued Apr. 8, 2014 in CN Application No. 201080007057.4.

* cited by examiner

*Primary Examiner* — Anthony J Green
(74) *Attorney, Agent, or Firm* — Panitch Schwarze Belisario & Nadel LLP

(57) ABSTRACT

The invention relates to a method for producing a friction lining of a brake shoe, wherein a binder is added to an open-pore carrier material having a high specific surface area, and the carrier material and the binder are mixed until the carrier material is almost completely wetted with the binder, wherein a functional material is then added that is at least partially absorbed by the carrier material. The invention also relates to a corresponding brake lining.

17 Claims, No Drawings

METHOD FOR PRODUCING A BRAKE LINING AND BRAKE LINING

CROSS-REFERENCE TO RELATED APPLICATIONS

This application is a national stage application (under 35 U.S.C. §371) of PCT/EP2010/000822, filed Feb. 11, 2010, which claims benefit of German application 10 2009 009 131.9, filed Feb. 17, 2009.

TECHNICAL FIELD AND STATE OF THE ART

The invention relates to a method for producing a friction lining of a brake shoe as well as to a corresponding friction lining of a brake shoe.

In the state of the art, a wide array of methods are known for the production of a friction lining of a brake shoe.

Friction linings can be classified in various categories, for example, metallic friction linings, organic friction linings, friction linings with a low metal content as well as ceramic friction linings. The classification of the friction linings depends on the choice of the friction material.

The friction linings contain a plurality of different substances with different functions. One component is the friction material, which accounts for the lion's share of the friction coefficient between the brake shoe and the counterpart, for example, a drum brake or a disc brake. Moreover, fillers and binders are used.

The fillers likewise have different functions. One of the functions is to provide a lubrication that reduces the braking noise and improves the comfort. From the state of the art, it is a known procedure to use metal sulfides and non-ferrous metals as lubricants in order to improve the comfort properties of the friction linings. However, these materials have to be present in the fillers in relatively large quantities, which, due to the high cost of the raw materials, greatly increases the price of the brake linings.

SUMMARY OF THE INVENTION

Therefore, an object of the invention is to put forward a method for the production of a friction lining, a corresponding friction lining as well as a brake shoe, all of which have the same or better comfort properties than the friction linings known from the state of the art, but which can make do with smaller quantities of functional materials than the friction linings known from the state of the art.

A method according to the invention for the production of a friction lining for a brake shoe provides for the use of a carrier material with a high open porosity. Such a carrier material is very well suited to absorb functional materials in its interior or in cavities that extend to the edge.

A binder is added to the highly porous carrier material, and the carrier material and the binder are mixed until the open surfaces of the carrier material are almost completely wetted with the binder. The binder facilitates the absorption and bonding of functional materials to the carrier material. The more completely the carrier material is wetted with the binders, the higher its capacity to absorb the functional material.

In the next step, a functional material is added to the carrier material-binder mixture and this functional material is at least partially absorbed by the carrier material or by the carrier material-binder mixture.

Therefore, in a simple manner, the method provides a friction lining with which a functional material is incorporated into a carrier material in such a way that it is very well bonded to the carrier material and that yields the same or even better properties in comparison to the friction linings known from the state of the art, and yet with much smaller quantities of functional materials. Due to the inventive sequential addition of binder to a carrier material and then the addition of a functional material to the carrier material-binder mixture, it can be achieved that the functional material can be incorporated especially easily into the carrier material or adheres to the carrier material.

A first advantageous refinement of the invention provides that the carrier material and the binder are homogenized in a mixer. In this manner, the amount of binder needed can be reduced.

Preferably, the binder is also added in the form of a binder solution, resulting in a better wetting of the carrier material with the binder.

The concentration of binder in the binder solution is preferably between 0.5% and 50%, especially preferably between 2% and 8% in the case of binder A.

Another advantage is attained when the carrier material and the binder are mixed at a low speed. In this manner, on the one hand, the porous carrier material is handled gently during the mixing, and on the other hand, a more uniform wetting with the binder solution can be achieved, since, due to the viscosity of the binder solution, it takes a certain amount of time to almost completely wet the entire surface of the carrier material.

If the mixer employed has a mixing screw or a rotating mixing drum or the like, it is preferred if the mixing drum or mixing screw or the like operates at a slow rotational speed.

Preferably, the functional material is added in such a proportion that the material is not tacky after the mixing, that is to say, after the bonding of the functional material to the carrier material, and so that the wetted carrier material is saturated with the functional material. In this manner, the friction lining material produced by means of the method according to the invention is easy to process further and, at the same time, a high effectiveness of the functional material in the ready-made friction lining is achieved.

Another refinement of the invention provides that the mixture is dried after the functional material has been added and mixed. As a result, the friction lining material can be further processed very easily.

Preferably, the residual moisture after the drying is between 0.3% and 5%, preferably between 0.7% and 2%. It is especially preferable for the residual moisture to be about 1%. In this manner, the material can be further processed very easily.

A embodiment of the invention relates to a friction material for a brake shoe of a motor vehicle that has a carrier material with a high open porosity, that is wetted with a binder, and that is applied onto or incorporated into a functional material. Such a friction material can provide a functional material in a much lower concentration than the friction materials known from the state of the art, as a result of which the costs incurred for the friction materials can be substantially lowered.

The friction material according to the invention nevertheless has properties that are equally good or even better thanks to the functional material since, due to the carrier material, the functional material can be readily released.

Preferably, the degree of wetting of the carrier material with binders lies between 80% and 100%, preferably between 90% and 100%, especially preferably between 98% and 100%. The higher the degree of wetting, that is to say, the coverage of the entire surface of the carrier material with binder, the better the bonding of the functional material to the carrier material.

Suitable carrier materials have proven to be those materials that have a specific surface area of 20 m$^2$/g to 80 m$^2$/g, preferably 40 m$^2$/g to 70 m$^2$/g, especially preferably 50 m$^2$/g. The specific surface area of the carrier material refers to the carrier material without wetting with a binder. As a rule, wetting with the binder diminishes the specific surface area.

At higher specific surface areas, the porosity of the carrier material has to be so high that it is no longer able to withstand the mechanical stresses encountered during braking operations, since, as the specific surface area decreases, the capacity to absorb the functional material is no longer sufficient.

At about 50 m$^2$/g, the effect of the functional material in the friction material can be compared to that of a direct incorporation of the functional material into the friction material.

The particle sizes of the carrier material are preferably between 90 μm and 1.5 mm, as a result of which the friction material is easy to process.

Within the limits between 90 μm and 1.5 mm, the particle sizes of the carrier material preferably have a normal distribution. Thanks to a normal distribution of the particle sizes between 90 μm and 1.5 mm, it can be achieved that the carrier material that is filled with the functional material is well distributed in the friction material.

The carrier material and the binder are preferably mixed at a surface speed of the particles of 5 m/sec to 50 m/sec, preferably 10 m/sec to 20 m/sec. At these surface speeds, the porous components are not damaged and the quality of the friction material is not diminished.

Preferred materials for the carrier material are diatomaceous earth and clay, especially preferably a natural calcinated mixture of diatomaceous earth and clay. Such a carrier material is inexpensive and has very good physical and chemical properties so that it can easily be wetted with the binder and filled with functional materials. Moreover, a natural, calcinated mixture of diatomaceous earth and clay is chemically inert, temperature-resistant up to about 1000° C. [1832° F.] and environmentally as well as toxicologically safe.

Preferably, the portion of functional materials in the friction material is selected in such a way that the mixture of carrier material, binder and functional material is not tacky, and/or that the wetted carrier material is saturated with the functional material. This ensures that the functional material is highly effective in the carrier material and, at the same time, that the friction material is very easy to process.

If the functional material is also configured as a lubricant, then the friction material according to the invention can also achieve especially good comfort properties with the use of just a small amount of lubricant.

Preferred functional materials are metal sulfide, graphite, metals or mixtures of these materials, but especially molybdenum sulfide. Such functional materials have a good lubricant effect and can be readily incorporated into the porous carrier material.

The functional material is preferably present as a functional raw material or as a functional matrix.

If the binder contains starch, organic and/or inorganic components, the additional advantage can be achieved that these materials provide a good bond between the functional material and the carrier material, as a result of which the effectiveness of the friction material is increased.

Preferably, the binder is used as a binder solution, as a result of which a higher degree of wetting of the carrier material with binders can be achieved.

Another embodiment of the invention relates to a brake shoe with a friction material that has been produced by means of the above-mentioned method for producing the friction lining. Such a brake shoe can acquire properties that are comparable to those of conventional brake shoes, but with far smaller portions of functional materials, thereby reducing the price of such a brake shoe.

A last embodiment of the invention relates to a brake shoe with a friction material according to the invention described above. Such a brake shoe can acquire properties that are comparable to those of conventional brake shoes, but with far smaller portions of functional materials, thereby reducing the price of such a brake shoe.

Additional objectives, features and advantageous application possibilities of the present invention ensue from the description below of an embodiment. In this context, all of the described and/or depicted features either on their own or in any meaningful combination constitute the subject matter of the present application, also irrespective of the claims and the way they relate back thereto.

DETAILED DESCRIPTION OF EMBODIMENTS

The invention is explained with reference to embodiments.

In order to produce a friction material according to one embodiment of the invention, a natural calcinated mixture of diatomaceous earth and clay is used whose particle sizes are between 90 μm and 1.5 mm. The particle size distribution corresponds essentially to a normal distribution within these limits.

The starting material has a specific surface area of about 50 m$^2$/g and a high mechanical strength.

The carrier material is homogenized together with a binder in a mixer at a very low speed so that the binder is well distributed on and in the carrier material. For this purpose, the binder is present in a solution with a suitable solvent, and the concentration is between 0.5% and 50%. This results in a carrier material that is essentially 100% wetted and that has a very good adhesion capacity for functional materials that are to be incorporated.

Once the carrier material has been completely wetted with the binder, the carrier material-binder mixture is mixed with the functional raw material matrix. The functional raw material matrix is added in such a proportion as to yield a homogeneous, non-tacky compound in which the carrier material is saturated with the functional raw material matrix.

Subsequently, the carrier material that has been provided with the functional raw material matrix is dried until a residual moisture of about 1% is reached.

The preferred functional raw material is molybdenum sulfide, which has proven to be an appropriate substitute for antimony trisulfide. For one thing, antimony trisulfide oxidizes at higher temperatures to form antimony trioxide, which is categorized as a class 3 carcinogen, whereas molybdenum sulfide does not have a carcinogenic effect. Moreover, molybdenum sulfide exhibits technical properties that are comparable to those of antimony trisulfide.

Example

Production of a Carrier Material in Accordance with the Method According to the Invention 3990 parts of the carrier material are placed into a mixer together with 2100 parts of binder (for example, water and hydrated sodium silicate at a ratio of 1:1), and then mixed for 5 minutes at the lowest speed or at a fairly low speed. Subsequently, 350 parts of molybdenum sulfide, 490 parts of a multi-component lubricant containing, for example, iron-II-sulfide, tin-II-sulfide and/or titanium-IV-sulfide, as well as 140 parts of tin-II-sulfide are added and mixed for another 2 minutes at a constant rotational speed.

After the mixing procedure is finished, the mixture thus formed is dried at 100° C. [212° F.] until a low residual moisture is reached, for instance, 1%.

While preferred embodiments of the invention have been described and illustrated here, various changes, substitutions and modifications to the described embodiments will become apparent to those of ordinary skill in the art without thereby departing from the scope and spirit of the invention.

The invention claimed is:

1. A method for making a friction lining for a brake shoe, comprising:
    mixing an open-pore carrier material having particle sizes between 90 μm and 1.5 mm selected from the group consisting of: diatomaceous earth, clay, a mixture of diatomaceous earth and clay, and a calcinated mixture of diatomaceous earth and clay, with a binder solution to form a mixture;
    adding to the carrier material-binder mixture one or more functional materials selected from the group consisting of: a metal sulfide, graphite, metals, and mixtures thereof, to form a mixture;
    drying the mixture of carrier material, binder and functional material(s) until the residual moisture of the mixture is between 0.3% and 5%; and
    forming the mixture into a friction lining for a brake shoe.

2. The method of claim 1, wherein the mixture is formed into a friction lining for a brake shoe before it is dried.

3. The method of claim 1, wherein the binder solution has a concentration of binder between 0.5% and 50%.

4. The method of claim 1, wherein the degree of wetting of the carrier material with binder solution lies between 80% and 100%.

5. The method of claim 1, wherein the carrier material has a specific surface area of 20 $m^2/g$ to 80 $m^2/g$.

6. The method of claim 1, wherein the particle sizes of the carrier material have a normal distribution.

7. The method of claim 1, wherein the carrier material and binder solution are mixed at a surface speed of particles of 5 m/sec to 50 m/sec.

8. The method of claim 1, wherein the functional material is molybdenum sulfide.

9. A method for making a friction lining for a brake shoe, comprising:
    mixing an open-pore carrier material having particle sizes of between 90 μm and 1.5 mm selected from the group consisting of diatomaceous earth, clay, a mixture of diatomaceous earth and clay, and a calcinated mixture of diatomaceous earth and clay, with a binder solution to form a mixture;
    adding to the carrier material-binder mixture one or more functional materials selected from the group consisting of: a metal sulfide, graphite, metals, and mixtures thereof, to form a mixture;
    drying the mixture of carrier material, binder and functional material(s); and
    forming the mixture into a friction lining for a brake shoe.

10. The method of claim 9, wherein the binder solution has a concentration of binder between 0.5% and 50%.

11. The method of claim 9, wherein the mixture of carrier material, binder and functional material(s) is dried until the residual moisture of the mixture is about 1%.

12. The method of claim 9, wherein the degree of wetting of the carrier material with binder solution lies between 80% and 100%.

13. The method of claim 9, wherein the carrier material has a specific surface area of 20 $m^2/g$ to 80 $m^2/g$.

14. The method of claim 9, wherein the particle sizes of the carrier material have a normal distribution.

15. The method of claim 9, wherein the carrier material and binder solution are mixed at a surface speed of particles of 5 msec to 50 m/sec.

16. The method of claim 9, wherein the functional material is molybdenum sulfide.

17. The method of claim 9, wherein the mixture is formed into a friction lining for a brake shoe before it is dried.

* * * * *